United States Patent
Hill et al.

(10) Patent No.: US 11,707,927 B2
(45) Date of Patent: Jul. 25, 2023

(54) HIGHLY-FILLED POLYURETHANE COMPOSITES WITH FIBER REINFORCEMENT

(71) Applicant: Westlake Royal Building Products Inc., Houston, TX (US)

(72) Inventors: Russell Hill, San Antonio, TX (US); Amitabha Kumar, San Antonio, TX (US); Hamed Lakrout, San Antonio, TX (US); Li Al, San Antonio, TX (US); Russ Majors, San Marcos, TX (US); Brian Shaw, Elmendorf, TX (US); Robert F. Rathbone, San Antonio, TX (US); Cassandra Hill, San Antonio, TX (US)

(73) Assignee: Westlake Royal Building Products Inc., Houston, TX (US)

( * ) Notice: Subject to any disclaimer, the term of this patent is extended or adjusted under 35 U.S.C. 154(b) by 897 days.

(21) Appl. No.: 16/093,247

(22) PCT Filed: Apr. 15, 2016

(86) PCT No.: PCT/US2016/027863
§ 371 (c)(1),
(2) Date: Oct. 12, 2018

(87) PCT Pub. No.: WO2017/180154
PCT Pub. Date: Oct. 19, 2017

(65) Prior Publication Data
US 2021/0187925 A1    Jun. 24, 2021

(51) Int. Cl.
*B32B 27/40* (2006.01)
*B32B 27/18* (2006.01)
(Continued)

(52) U.S. Cl.
CPC ............... *B32B 27/40* (2013.01); *B32B 5/16* (2013.01); *B32B 5/24* (2013.01); *B32B 5/30* (2013.01);
(Continued)

(58) Field of Classification Search
CPC ......... B32B 27/40; B32B 27/18; B32B 27/06; B32B 5/16; B32B 5/30; B32B 5/24;
(Continued)

(56) References Cited

U.S. PATENT DOCUMENTS 4,073,997 A    2/1978   Richards et al.
4,088,808 A *  5/1978   Cornwell ................. B28B 7/36
                                                    428/409
(Continued)

FOREIGN PATENT DOCUMENTS

WO    WO 2009-023170 A2    2/2009

OTHER PUBLICATIONS

International Search Report for PCT/2016/027863 dated Dec. 8, 2016 (4 pages).

*Primary Examiner* — Tahseen Khan
(74) *Attorney, Agent, or Firm* — Bookoff McAndrews, PLLC (57) ABSTRACT

Composite panels and methods of preparation are described herein. In some embodiments, the composite panel can include a first fiber reinforcement, a polyurethane composite having a first surface and a second surface opposite the first surface, wherein the first surface is in contact with the first fiber reinforcement; and a cementitious material adjacent the first fiber reinforcement opposite the polyurethane composite. The polyurethane composite can be formed from (i) one or more isocyanates selected from the group consisting of diisocyanates, polyisocyanates, and mixtures thereof, (ii) one or more polyols, and (iii) a particulate filler. The fiber
(Continued)

reinforcement can be formed from a woven or non-woven material, such as glass fibers. The composite panel can further include a material, such as a second fiber reinforcement and a cementitious layer, in contact with the second surface of the polyurethane composite. Articles comprising the composite panels are also disclosed.

20 Claims, 1 Drawing Sheet

(51) Int. Cl.
| | | |
|---|---|---|
| B32B 27/06 | (2006.01) | |
| B32B 5/16 | (2006.01) | |
| B32B 5/30 | (2006.01) | |
| B32B 5/24 | (2006.01) | |
| B32B 13/12 | (2006.01) | |
| B32B 13/02 | (2006.01) | |
| B32B 13/14 | (2006.01) | |
| C04B 18/08 | (2006.01) | |
| C04B 103/12 | (2006.01) | |
| C04B 111/00 | (2006.01) | |

(52) U.S. Cl.
CPC .............. *B32B 13/02* (2013.01); *B32B 13/12* (2013.01); *B32B 13/14* (2013.01); *B32B 27/06* (2013.01); *B32B 27/18* (2013.01); *C04B 18/08* (2013.01); *B32B 2250/03* (2013.01); *B32B 2262/101* (2013.01); *B32B 2307/72* (2013.01); *C04B 2103/12* (2013.01); *C04B 2111/00612* (2013.01)

(58) Field of Classification Search
CPC ......... B32B 13/12; B32B 13/02; B32B 13/14; C04B 18/08
USPC ...................................................... 428/425.5
See application file for complete search history.

(56) References Cited

U.S. PATENT DOCUMENTS

| | | | |
|---|---|---|---|
| 4,164,526 A | 8/1979 | Clay et al. | |
| 4,204,019 A | 5/1980 | Parker | |
| 4,459,334 A | 7/1984 | Blanpied et al. | |
| 4,661,533 A | 4/1987 | Stobby | |
| 5,112,678 A | 5/1992 | Gay et al. | |
| 5,891,563 A | 4/1999 | Letts | |
| 7,645,490 B2 | 1/2010 | Bush et al. | |
| 7,867,927 B2 | 1/2011 | Bush et al. | |
| 7,989,370 B2 | 8/2011 | Currier et al. | |
| 8,453,390 B2 | 6/2013 | Letts et al. | |
| 8,703,632 B2 | 4/2014 | Schlueter | |
| 8,757,704 B2 | 6/2014 | Zhao et al. | |
| 8,846,776 B2 | 9/2014 | Herrington et al. | |
| 2006/0078753 A1* | 4/2006 | Bomberg ................ B32B 27/20 428/479.3 |
| 2009/0324932 A1 | 12/2009 | Laycock et al. | |
| 2011/0086931 A1* | 4/2011 | Herrington ........ C08G 18/7664 521/83 |
| 2012/0088089 A1 | 4/2012 | Zetouna et al. | |
| 2014/0349104 A1* | 11/2014 | Hill ...................... C04B 28/006 428/319.1 |
| 2015/0166408 A1* | 6/2015 | Bescher ................ C04B 28/021 106/692 |
| 2015/0240492 A1* | 8/2015 | Teng ...................... E04C 5/073 442/327 |

\* cited by examiner

HIGHLY-FILLED POLYURETHANE COMPOSITES WITH FIBER REINFORCEMENT

This application is a U.S. National Stage filing under 35 U.S.C. § 371 of International Patent Application No. PCT/US2016/027863, filed on Apr. 15, 2016.

FIELD OF THE DISCLOSURE

This disclosure relates generally to polyurethane composites, more particularly, to the use of a fiber reinforcement on polyurethane composites.

BACKGROUND OF THE DISCLOSURE

Polymeric composites that contain organic and/or inorganic filler materials have become desirable for a variety of uses because of their excellent mechanical properties and weathering stability. In general, the superior properties of the organic-inorganic composites are achieved through use of the organic as a matrix material that acts as a glue with enhanced flexural properties or as a fibrous component providing reinforcement and improved tensile properties. The inorganic material imparts various properties of rigidity, toughness, hardness, optical appearance, interaction with electromagnetic radiation, density, and many other physical and chemical attributes.

The use of polyurethane composites has grown due to their superior tensile strength, impact resistance, and abrasion resistance compared to, for example, unsaturated polyester and vinyl ester-based composites. One method of manufacturing high-performance highly-filled polyurethane composite products includes increasing the content of the reinforcement, such as inorganic fibers, in such products. However, when the reinforcing inorganic fiber content is increased, the viscosity of the starting composite mixture increases, making processing into products more difficult. In addition, when a large amount of reinforcing inorganic fiber is used, more fibers can break and crush during the manufacturing process because of their brittle nature, resulting in a decrease in the reinforcing effect of the fibers. Thus, there is a need for alternate reinforcing materials in polyurethane composites. The compositions and methods described herein address these and other needs.

SUMMARY OF THE DISCLOSURE

Composite panels and methods of manufacturing are described herein. In some embodiments, the composite panel can include a first fiber reinforcement; a polyurethane composite having a first surface and a second surface opposite the first surface, wherein the first surface is in contact with the first fiber reinforcement; and a cementitious material adjacent the first fiber reinforcement opposite the polyurethane composite. In some embodiments, the composite panel can include a material in contact with the second surface of the polyurethane composite. The material can include a cementitious layer, a paper sheet, a metal sheet, a polymeric layer, or a combination thereof. In certain embodiments, the material includes a second fiber reinforcement. In some examples, a cementitious layer can be adjacent the second fiber reinforcement.

The polyurethane composite can include a polyurethane. In some embodiments, the polyurethane composite comprises (a) a polyurethane formed by the reaction of (i) one or more isocyanates selected from the group consisting of diisocyanates, polyisocyanates, and mixtures thereof, and (ii) one or more polyols, and (b) a particulate filler. The amount of polyurethane in the polyurethane composite can be from 15% to 60% by weight, e.g., 15% to 45% by weight, based on the total weight of the polyurethane composite. The one or more polyols used to produce the polyurethane composite can include 25% or less of one or more first polyols. In some embodiments, the one or more first polyols can each comprise a hydroxyl number of greater than 300 mg KOH/g. In some embodiments, the functionality of the one or more first polyols can range from 3.5 to 8. In some examples, the one or more first polyols in the polyurethane composite can include a Mannich polyol. The one or more polyols used to produce the polyurethane composite can include 50% or more of one or more second polyols. In some embodiments, the one or more second polyols can each comprise a hydroxyl number of less than 300 mg KOH/g. In some embodiments, the functionality of the one or more second polyols can range from 1 to 3. In some examples, the one or more second polyols in the polyurethane composite can include an aromatic polyester polyol or an aromatic polyether polyol.

The particulate filler in the polyurethane composite can include coal ash such as fly ash. The amount of particulate filler in the polyurethane composite can be from 40 to 90% by weight, based on the total weight of the polyurethane composite. For example, the particulate filler can be present in an amount from 35% to 90% or from 50% to 80% by weight, based on the total weight of the polyurethane composite.

The polyurethane composite can include a fiber material. The amount of fiber material in the polyurethane composite can be from 0.25% to 10% by weight, based on the total weight of the polyurethane composite. For example, the fiber material can be present in an amount from 0.25% to 8%, from 0.25% to 6%, from 0.5% to 6%, or from 0.5% to 5% by weight, based on the total weight of the polyurethane composite. Examples of fiber materials useful in the polyurethane composite can include a plurality of glass fibers, polyalkylene fibers, polyester fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, carbon fibers, metal and metal-coated fibers, mineral fibers, or combinations thereof. In some embodiments, the polyurethane composite comprises a plurality of glass fibers. The glass fibers can have an average length of 1 mm or greater. In some examples, the glass fibers can have an average length of from 1.5 mm to 30 mm. In some embodiments, the polyurethane composite is free of a fiber material.

The density of the polyurethane composite can be from 2 lb/ft³ to 60 lb/ft³. In some embodiments, the density of the polyurethane composite can be from 2 lb/ft³ to 30 lb/ft³, from 10 lb/ft³ to 30 lb/ft³, from 35 lb/ft³ to 60 lb/ft³, or from 35 lb/ft³ to 50 lb/ft³. In some examples, the polyurethane composite is foamed.

The fiber reinforcement in the composite panel can be formed from a woven or non-woven material. The fiber reinforcement can include a fiber material as described herein. In some embodiments, the fiber reinforcement includes glass fibers. The fibers in the fiber reinforcement can have a diameter of from 1 to 100 microns. In some embodiments, the fiber reinforcement can have a basis weight of 20 g/ft² or less, e.g., from 0.5 g/ft² to 10 g/ft². In some embodiments, the thickness of the fiber reinforcement can be 0.001 inch or greater, e.g., from 0.001 inch to 0.1 inch.

In some embodiments, the cementitious material in the composite panel includes a rapid set cement. Examples of suitable rapid set cements useful in the cementitious material include calcium aluminate cement (CAC), calcium phosphate cement, calcium sulfate hydrate, calcium sulfoaluminate (CSA) cement, magnesium oxychloride cement, magnesium oxysulfate cement, magnesium phosphate cement, or combinations thereof. In some embodiments, the cementitious material includes Portland cement. In some embodiments, the cementitious material can further include fly ash, slag, sand, or combinations thereof. In these examples, the amount of fly ash, slag, sand, or combination thereof, present in the cementitious material can be 30% or less by weight, based on the total weight of the cementitious material.

In some embodiments, the cementitious material can be derived from an inorganic polymer formed by reacting in the presence of water: a reactive powder comprising fly ash and an activator. The fly ash can be present in an amount of 85% or greater by weight, based on the total weight of the reactive powder. In some embodiments, the reactive powder can further include a rapid set cement as described herein. In some embodiments, the reactive powder can further include Portland cement. In some embodiments, the reactive powder consists of fly ash.

The cementitious material in the composite panel can include a photocatalyst, such as titanium dioxide.

The average thickness of the cementitious material in the composite panel can be from 0.005 inch to 0.25 inch.

The composite panel can include an adhesive layer. The adhesive layer can be present to adhere the cementitious material to the polyurethane composite and the fiber reinforcement. And suitable adhesive can be used in the adhesive layer, e.g., an adhesive derived from ethylene vinyl acetate, acrylic, urethane, epoxy, starch, gum, resin, or combinations thereof. In some embodiments, the composite panel does not include an adhesive layer. The cementitious material, the fiber reinforcement, and the polyurethane composite can be directly adhered without the use of an adhesive layer.

In some examples, the composite panel can include a first fiber glass reinforcement; a polyurethane composite having a first surface and a second surface opposite the first surface, wherein the first surface is in contact with the first fiber reinforcement; a first cementitious material adjacent the first fiber glass reinforcement opposite the polyurethane composite; a second fiber glass reinforcement in contact with the second surface of the polyurethane composite; and a second cementitious material adjacent the second fiber glass reinforcement opposite the polyurethane composite.

Articles comprising the composite panels described herein are also disclosed. In some embodiments, the article can be a building material. The building material can be selected from a tile backer, a sheathing, a roofing product, a cladding, or a building panel. In some embodiments, building materials that can be formed from the composite panel include roof cover boards, slate panels, and shake panels.

Methods of making the composite panels (e.g., building materials) are also described herein. The method can include mixing the (i) one or more isocyanates selected from the group consisting of diisocyanates, polyisocyanates, and mixtures thereof, (ii) one or more polyols, and (iii) particulate filler to form a mixture. The mixture may further comprise a catalyst. The method can include allowing the one or more isocyanates and the one or more polyols to react in the presence of the particulate filler. In some embodiments, the polyurethane composite is formed in a mold.

The method of making the composite panels can include applying a first fiber reinforcement to the first surface of the polyurethane composite. In some embodiments, the first fiber reinforcement can be applied to the polyurethane composite before it has completely cured such that at least a portion of the first fiber reinforcement becomes embedded in the polyurethane composite. For example, the mixture (including the one or more isocyanates, the one or more polyols, and the particulate filler) can be fed to a mold; the first fiber reinforcement can be applied to the mixture in the mold; and the one or more isocyanates and the one or more polyols react in the presence of the particulate filler in the mold to form a polyurethane composite. In some examples, the first fiber reinforcement can be applied to a mold; the mixture can be fed to the first fiber reinforcement in the mold; and the one or more isocyanates and the one or more polyols react in the presence of the particulate filler in the mold to form a polyurethane composite. In some embodiments, the first fiber reinforcement can be applied to the polyurethane composite after the polyurethane composite has been cured.

The method of making the composite panels can include applying a cementitious slurry to the first fiber reinforcement. The method can include applying a liquid to the first surface of the polyurethane composite to activate the cementitious slurry. The liquid can be an aqueous solution having a pH of 6.5 or greater. In some embodiments, the liquid includes an activator. In some embodiments, the cementitious slurry can be applied to the first fiber reinforcement prior to applying the first fiber reinforcement to the polyurethane composite. The cementitious slurry can be applied by roller coating, curtain coating, dip coating, brushing, with a trowel, or spraying.

In some embodiments, the method can include applying an adhesive to the composite. In some examples, the adhesive can be applied to the first fiber reinforcement prior to applying the cementitious slurry. In some examples, the adhesive can be applied to the first surface of the polyurethane composite prior to applying the first fiber reinforcement and/or the cementitious slurry. The adhesive can be applied by spray coating, curtain coating, brushing, roller coating, dip coating, spin coating, or flow coating.

In some embodiments, the method of making the composite panels can include applying a material comprising a cementitious layer, a paper sheet, a metal sheet, a polymeric layer, or a combination thereof to the second surface of the polyurethane composite. In some examples, the method includes applying a second fiber reinforcement to the second surface of the polyurethane composite. In some examples, the method further includes applying a cementitious layer to the second fiber reinforcement.

DETAILED DESCRIPTION

Figure 1:
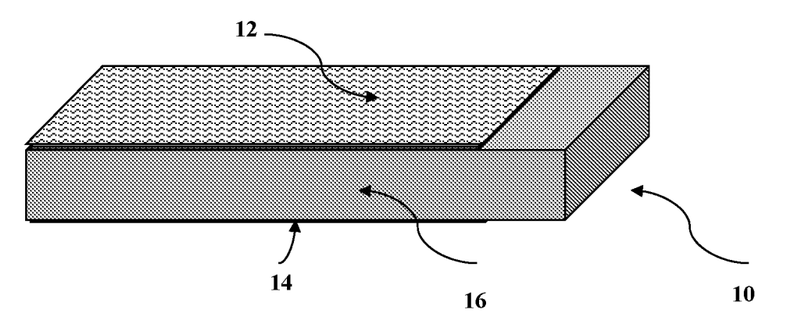
FIG. 1 is a schematic drawing of a composite panel (10) including a polyurethane composite (14) and surface meshes (12 and 16) on opposite faces of the polyurethane composite.

Composite panels including a fiber reinforcement and methods of preparing composite panels are described herein. The composite panels can include a polyurethane composite. The polyurethane composites can comprise a polyurethane formed using highly reactive systems such as highly reactive polyols, highly reactive isocyanates, or both.

Isocyanates suitable for use in the polyurethane composites described herein include one or more monomeric or oligomeric poly- or di-isocyanates. The monomeric or oligomeric poly- or di-isocyanate include aromatic diisocyanates and polyisocyanates. The isocyanates can also be blocked isocyanates or pre-polymer isocyanates. An example of a useful diisocyanate is methylene diphenyl diisocyanate (MDI). Useful MDI's include MDI monomers, MDI oligomers, and mixtures thereof.

Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties,* $2^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

The average functionality of isocyanates useful with the polyurethane composites described herein can be between about 1.5 to about 5. Further, examples of useful isocyanates include isocyanates with an average functionality of about 2 to about 4.5, about 2.2 to about 4, about 2.4 to about 3.7, about 2.6 to about 3.4, and about 2.8 to about 3.2.

As indicated herein, the polyurethane composites include one or more polyols. The one or more polyols for use in the polyurethane composite can include polyester polyols, polyether polyols, Mannich polyols, or combinations thereof. In some embodiments, the one or more polyols can include 30% or less of one or more highly reactive (i.e., first) polyols. For example, the one or more polyols can include 27% or less, 25% or less, 23% or less, 20% or less, of one or more highly reactive polyols.

In some embodiments, the one or more highly reactive polyols can include polyols having a hydroxyl number of greater than 250. For example, the hydroxyl number can be greater than 275, greater than 300, greater than 325, greater than 350, greater than 375, greater than 400, greater than 425, greater than 450, greater than 475, greater than 500, greater than 525, greater than 550, greater than 575, greater than 600, greater than 625, greater than 650, greater than 675, greater than 700, greater than 725, or greater than 750.

In some embodiments, the one or more highly reactive polyols can include polyols having a primary hydroxyl number of greater than 250. As used herein, the primary hydroxyl number is defined as the hydroxyl number multiplied by the percentage of primary hydroxyl groups based on the total number of hydroxyl groups in the polyol. For example, the primary hydroxyl number can be greater than 300, greater than 320, greater than 340, greater than 360, greater than 380, greater than 400, greater than 420, greater than 460, greater than 465, or greater than 470.

In some embodiments, the one or more highly reactive polyols include a large number of primary hydroxyl groups (e.g. 75% or more) based on the total number of hydroxyl groups in the polyol. For example, the highly reactive polyols can include 80% or more, 85% or more, 90% or more, 95% or more, or 100% of primary hydroxyl groups. The number of primary hydroxyl groups can be determined using fluorine NMR spectroscopy as described in ASTM D4273.

The average functionality of the one or more highly reactive polyols useful with the polyurethane composites described herein can be 3.5 or greater, e.g., 3.5 or greater, 3.6 or greater, 3.7 or greater, 3.8 or greater, 3.9 or greater, 4.0 or greater, 4.1 or greater, 4.2 or greater, 4.5 or greater, 5 or greater, or 6 or greater. In some embodiments, the average functionality of the one or more highly reactive polyols useful with the polyurethane composites described herein can be 8 or less, e.g., 7 or less, 6 or less, 5.5 or less, 5 or less, or 4.5 or less. Further, examples of useful one or more highly reactive polyols include polyols with an average functionality of from 3.5 to 8, from 3.5 to 7, from 3.5 to 6, from 3.5 to 5, or from 4 to 5.

In some cases, the one or more highly reactive polyols has a molecular weight of 350 g/mol or greater (e.g., 400 g/mol or greater, 450 g/mol or greater, 460 g/mol or greater, 470 g/mol or greater, 480 g/mol or greater, or 500 g/mol or greater). In some cases, the one or more highly reactive polyols has a molecular weight of 1000 g/mol or less (e.g., 900 g/mol or less, 800 g/mol or less, 700 g/mol or less, 600 g/mol or less, 550 g/mol or less, 540 g/mol or less, 530 g/mol or less, 520 g/mol or less, 500 g/mol or less, 480 g/mol or less, or 450 g/mol or less). In some cases, the one or more highly reactive polyols has a molecular weight of from 350 g/mol to 1000 g/mol or less, from 350 g/mol to 900 g/mol or less, from 400 g/mol to 800 g/mol or less, or from 400 g/mol to 700 g/mol or less.

In some embodiments, the one or more highly reactive polyols can include a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl groups. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a $C_1$-$C_{18}$ alkyl, or a $C_1$-$C_{12}$ alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenols (e.g., a para-alkyl phenols). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, a trialkanolamine, a tetraalkanolamine, or combinations thereof. Examples of suitable monoalkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Suitable dialkanolamines include dialkanolamines which include two hydroxy-substituted $C_1$-$C_{12}$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl) amine (DEIPA), N,N-bis(2-hydroxypropyl)-N-(hydroxyethyl)amine (EDIPA), tris(2-hydroxybutyl)amine, hydroxyethyl di(hydroxypropyl)amine, hydroxypropyl di(hydroxyethyl)amine, tri(hydroxypropyl)amine, hydroxyethyl di(hydroxy-n-butyl)amine, hydroxybutyl di(hydroxypropyl)amine, and combinations thereof. Exemplary tetraalkanolamines include four hydroxy-substituted $C_1$-$C_{12}$ alkyl groups (e.g., four hydroxy-substituted $C_1$-$C_8$ alkyl groups, or four hydroxy-substituted $C_1$-$C_6$ alkyl groups). In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

In some embodiments, the one or more polyols include a less reactive (or second) polyol. For example, the polyurethane composite can be produced from one or more less reactive polyols in addition to one or more highly reactive polyols. Less reactive polyols can have lower hydroxyl numbers, lower numbers of primary hydroxyl groups and/or lower primary hydroxyl numbers than the highly reactive polyols. In some embodiments, the less reactive polyols can have hydroxyl numbers of less than 300, less than 290, less than 280, less than 270, less than 260, less than 250, less than 225, less than 200, less than 175, less than 150, less than 125, less than 100, less than 80, less than 60, less than 40, or even less than 20. In some embodiments, the less reactive polyols have about 50% or less primary hydroxyl groups, about 40% or less primary hydroxyl groups, about 30% or less primary hydroxyl groups, about 20% or less primary hydroxyl groups, or even about 10% or less primary hydroxyl groups. In some embodiments, the less reactive polyols can have primary hydroxyl numbers of less than about 220, less than about 200, less than about 180, less than about 160, less than about 140, less than about 120, less than about 100, less than about 80, less than about 60, less than about 40, or even less than about 20.

The average functionality of the one or more less reactive polyols useful with the composites described herein can be 3 or less, e.g., 2.8 or less, 2.6 or less, 2.5 or less, 2.3 or less, or 2 or less. In some embodiments, the average functionality of the one or more less reactive polyols useful with the polyurethane composites described herein can be 1 or greater, e.g., 1.2 or greater, 1.4 or greater, 1.5 or greater, 1.7 or greater, or 2 or greater. Further, examples of useful less reactive polyols include polyols with an average functionality of from 1 to 3, from 1.5 to 3 or from 1.5 to 2.5.

In some cases, the one or more less reactive polyols has a molecular weight of 350 g/mol or greater (e.g., 350 g/mol or greater, 400 g/mol or greater, 420 g/mol or greater, 440 g/mol or greater, 450 g/mol or greater, or 460 g/mol or greater). In some cases, the one or more less reactive polyols has a molecular weight of 600 g/mol or less (e.g., 550 g/mol or less, 500 g/mol or less, 480 g/mol or less, 460 g/mol or less, 450 g/mol or less, 440 g/mol or less, or 430 g/mol or less). In some cases, the one or more less reactive polyols has a molecular weight of from 350 g/mol to 600 g/mol or less, from 350 g/mol to 550 g/mol or less, or from 400 g/mol to 500 g/mol or less.

In some embodiments, the one or more less reactive polyols can include an aromatic polyester polyol, an aromatic polyether polyol, or a combination thereof. The aromatic polyol can have an aromaticity of 50% or less, such as 45% or less, or 40% or less. In some embodiments, the aromatic polyol can have an aromaticity of 35% or greater, such as 38% or greater, 40% or greater, or 45% or greater. In some examples, the one or more second polyols include an aromatic polyester polyol such as those sold under the TEROL® trademark (e.g., TEROL® 250). Other examples of less reactive polyols include castor oil; Stepanpol PS-2052A (commercially available from the Stepan Company); Agrol 2.0, 3.6, 4.3, 5.6 and 7.0 (plant-based polyols commercially available from BioBased Technologies); Ecopol 123 and Ecopol 124, which are commercially available from Ecopur Industries; Honey Bee HB-150 and HB-230, soybean oil-based polyols commercially available from MCPU Polymer Engineering; Terol 1154, commercially available from Oxid (Houston, Tex.); Multranol 3900, Multranol 3901, Arcol 11-34, Arcol 24-32, Arcol 31-28, Arcol E-351, Arcol LHT-42, and Arcol LHT-112, commercially available from Bayer; and Voranol 220-028, 220-094, 220-110N, 222-056, 232-027, 232-034, and 232-035, commercially available from Dow.

In certain cases, the polyurethane composite can include at least two polyols. For example, the at least two polyols can include 50% or more of the one or more less reactive (i.e., second) polyols. For example, the one or more less reactive polyols can be present in an amount of greater than 55%, greater than 60%, greater than 65%, greater than 70%, greater than 75%, greater than 80%, greater than 85%, greater than 90%, greater than 95%, or 100% by weight, based on the weight of the at least two polyols.

The one or more polyols for use in the polyurethane composite can have an average functionality of 1.5 to 6.0, 1.5 to 5.0, 1.8 to 4.0, or 1.8 to 3.5. The average hydroxyl number values (as measured in units of mg KOH/g) for the one or more polyols can be from 20 to 600 such as from 20 to 100, 100 to 600, from 150 to 550, from 200 to 500, from 250 to 440, from 300 to 415, from 340 to 400.

The polyurethane composites described herein can include one or more additional isocyanate-reactive monomers in addition to the one or more polyols. In some embodiments, the one or more additional isocyanate-reactive monomers can include an aromatic polyester polyol, an aromatic polyether polyol, or a combination thereof. In some embodiments, the one or more additional isocyanate-reactive monomers include an aromatic polyester polyol such as those sold under the TEROL® trademark (e.g., TEROL® 198). In some embodiments, the one or more additional isocyanate-reactive monomers can include a highly reactive polyol selected from Pel-Soy 744 and Pel-Soy P-750, soybean oil based polyols commercially available from Pelron Corporation; Agrol Diamond, a soybean oil based polyol commercially available from BioBased Technologies; Ecopol 122, Ecopol 131 and Ecopol 132, soybean oil polyols formed using polyethylene terephthalate and commercially available from Ecopur Industries; Stepanpol PD-110 LV and PS 2352, polyols based on soybean oil, diethylene glycol and phthallic anhydride and commercially available from Stepan Company; Voranol 280, 360 and WR2000, polyether polyols commercially available from Dow Chemical Company; Honey Bee HB-530, a soybean oil-based polyol commercially available from MCPU Polymer Engineering; Renewpol, commercially available from Styrotech Industries (Brooklyn Park, Minn.); JeffAdd B 650, a 65% bio-based content (using ASTM D6866-06) additive based on soybean oil commercially available from Huntsman Polyurethanes; Jeffol SG 360, a sucrose and glycerin-based polyol commercially available from Huntsman Polyurethanes; and derivatives thereof.

In some embodiments, the one or more additional isocyanate-reactive monomers can include a highly reactive plant-based polyols. The one or more plant-based polyols useful in the polyurethane composite can include polyols containing ester groups that are derived from plant-based fats and oils. Accordingly, the one or more plant-based polyols can contain structural elements of fatty acids and fatty alcohols. Starting materials for the plant-based polyols of the polyurethane component can include fats and/or oils of plant-based origin with preferably unsaturated fatty acid residues. The one or more plant-based polyols useful with the polyurethane composite include, for example, castor oil, coconut oil, corn oil, cottonseed oil, lesquerella oil, linseed oil, olive oil, palm oil, palm kernel oil, peanut oil, sunflower oil, tall oil, and mixtures thereof. In some embodiments, the one or more polyols do not include plant-based polyols.

The one or more additional isocyanate-reactive monomers can include, for example, amine and optionally hydroxyl groups. In some embodiments, the one or more additional isocyanate-reactive monomers can include a polyamine. The first isocyanate-reactive monomer can comprise a polyamine. Any suitable polyamine can be used. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

In some embodiments, the additional isocyanate-reactive monomer can include an alkoxylated polyamine (i.e., alkylene oxide-capped polyamines) derived from a polyamine and an alkylene oxide. Alkoxylated polyamine can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof.

Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diamine sold under the trade name CARPOL® EDAP-800 (Carpenter Co., Richmond, Va.).

The additional isocyanate-reactive monomer (when used) can be present in varying amounts relative the one or more polyols used to form the polyurethane. In some embodiments, the additional isocyanate-reactive monomer can be present in an amount of 30% or less, 25% or less, 20% or less, 15% or less, 10% or less, or 5% or less by weight based on the weight of the one or more polyols.

As indicated herein, in the polyurethane composite, one or more isocyanates are reacted with the one or more polyols (and any additional isocyanate-reactive monomers) to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

One or more catalysts can be added to facilitate curing and can be used to control the curing time of the polymer matrix. Examples of useful catalysts include amine-containing catalysts (such as DABCO, tetramethylbutanediamine, and diethanolamine) and tin-, mercury-, and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used based on the weight of the polyurethane composite.

The polyurethane can be present in the polyurethane composite in amounts from 10% to 60% based on the weight of polyurethane composite. For example, the polyurethane can be included in an amount from 14% to 60% or 20% to 50% by weight, based on the weight of the polyurethane composite. In some embodiments, the polyurethane can be present in an amount of 10% or greater, 15% or greater, 20% or greater, 25% or greater, 30% or greater, 35% or greater, 40% or greater, 45% or greater, 50% or greater, or 55% or greater by weight, based on the weight of the polyurethane composite. In some embodiments, the polyurethane can be present in an amount of 60% or less, 55% or less, 50% or less, 45% or less, 40% or less, 35% or less, 30% or less, 25% or less, 20% or less, or 15% or less by weight, based on the weight of polyurethane composite.

The polyurethane composite can include a particulate filler. Suitable examples of particulate fillers can be an ash, ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; slag; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; expanded clay; expanded shale; expanded perlite; vermiculite; volcanic tuff; pumice; hollow ceramic spheres; hollow plastic spheres; expanded plastic beads (e.g., polystyrene beads); ground tire rubber; and mixtures thereof. In some embodiments, the particulate filler includes an ash. The ash can be a coal ash or another type of ash such as those produced by firing fuels including industrial gases, petroleum coke, petroleum products, municipal solid waste, paper sludge, wood, sawdust, refuse derived fuels, switchgrass or other biomass material. The coal ash can be fly ash, bottom ash, or combinations thereof. In some examples, the particulate filler includes fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants is suitable for incorporation in the composites described herein. In some embodiments, the particulate filler consists of or consists essentially of fly ash.

The particulate filler can be present in the polyurethane composite described herein in amounts from 20% to 90% by weight. Examples of the amount of particulate filler present in the polyurethane composite described herein include 20%, 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% by weight. In some embodiments, the particulate filler, for example fly ash, can be present in amounts from 35% to 80% by weight such as from 50% to 80% by weight or from 50% to 75% by weight. In some embodiments, the particulate filler can be calcium carbonate and can be present from 20% to 70% by weight such as from 45% to 65% by weight. In some embodiments, the calcium carbonate can be limestone.

In some embodiments, the particulate filler can include sand. In certain embodiments, the particulate filler can include fly ash and sand. The amount of sand in the polyurethane composite can be from 0.1% to 15% by weight, based on the weight of the composite. In some embodiments, the polyurethane composites can include 15% or less, 14% or less, 12% or less, 10% or less, or 8% or less by weight sand. In some embodiments, the polyurethane composite can include 0.1% or greater, 0.5% or greater, 1% or greater, 2% or greater, 3% or greater, or 5% or greater by weight sand. In some embodiments, the polyurethane composite can include 1% to 15%, 1% to 10%, or 1% to 8% by weight sand.

In some embodiments, the particulate filler can include fly ash and calcium carbonate. In certain embodiments, the particulate filler can include fly ash, sand, and calcium carbonate. When used with fly ash, the amount of calcium carbonate in the polyurethane composites can be from 0.1% to 15% by weight, based on the weight of the polyurethane composite. In some embodiments, the polyurethane composite can include 15% or less, 14% or less, 12% or less, 10% or less, or 8% or less by weight calcium carbonate. In some embodiments, the polyurethane composite can include 0.1% or greater, 0.5% or greater, 1% or greater, 2% or greater, 3% or greater, or 5% or greater by weight calcium carbonate. In some embodiments, when used with fly ash, the polyurethane composite can include 1% to 15%, 1% to 10%, or 1% to 8% by weight calcium carbonate.

The polyurethane composite can include a fiber material. The fiber material can be any natural or synthetic fiber, based on inorganic or organic materials. Inorganic and organic fiber materials suitable for use with the polyurethane composite can include glass fibers, basalt fibers, alumina silica fibers, aluminum oxide fibers, silica fibers, carbon fibers, metal fibers, metal and metal-coated fibers, mineral fibers (such as stone wool, slag wool, or ceramic fiber wool), polyalkylene fibers, polyester fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, carbon fibers, or combinations thereof. In certain embodiments, the fiber material can include hemp fibers, sisal fibers, cotton fibers, straw, reeds, or other grasses, jute, bagasse fibers, bamboo fibers, abaca fibers, flax, southern pine fibers, wood fibers, cellulose, saw dust, wood shavings, lint, vicose, leather fibers, rayon, and mixtures thereof. Other suitable fiber materials include synthetic fibers such as, Kevlar, viscose fibers, Dralon® fibers, polyethylene fibers, polyethylene terephthalate fibers, polyethylene naphthalate fibers, polypropylene fibers, polyvinyl alcohol fibers, aramid fibers, or combinations thereof. In some embodiments, the fiber material can include glass fibers. Glass fibers can include fibrous glass such as E-glass, C-glass, S-glass, and AR-glass fibers. In some examples, fire resistant or retardant glass fibers can be included to impart fire resistance or retarding properties to the polyurethane composites. In some embodiments, the polyurethane composite can include a combination of fibers that break and fibers that do not break when the composite is being formed using processing machinery and/or fractured by external stress.

In some embodiments, the fiber material can be dispersed within the polyurethane composite. The fiber material in the polyurethane composite can be present in the form of individual fibers, chopped fibers, bundles, strings such as yarns, fabrics, papers, rovings, mats, or tows. In some embodiments, the polyurethane composite can include a plurality of glass fibers. The average length of the glass fibers in the polyurethane composite can be 1 mm or greater, 1.5 mm or greater, 2 mm or greater, 3 mm or greater, 4 mm or greater, 5 mm or greater, or 6 mm or greater. In some embodiments, the average length of the glass fibers can be 50 mm or less, 40 mm or less, 30 mm or less, 20 mm or less, 15 mm or less, 12 mm or less, or 10 mm or less. In some examples, the glass fibers can be from 1 mm to 50 mm in average length. For example, the glass fibers can be from 1.5 mm to 30 mm, from 2 mm to 30 mm, from 3 mm to 30 mm, or from 3 mm to 15 mm in average length. The glass fibers in the polyurethane composites can have any dimension of from 1 µm to 30 µm in average diameter. For example, the average diameter of the glass fibers can be 1.5 µm to 30 µm, 3 µm to 20 µm, 4 µm to 18 µm, or 5 µm to 15 µm in average diameter. The glass fibers can be provided in provided in the polyurethane composite in a random orientation or can be axially oriented.

The fiber material (when used) can be present in the polyurethane composite in amounts from 0% to 15% by weight, based on the weight of polyurethane composite. For example, the fiber material can be present in amounts from 0.25% to 15%, 0.5% to 15%, 1% to 15%, 0.25% to 10%, 0.5% to 10%, 1% to 10%, 0.25% to 8%, 0.25% to 6%, or 0.25% to 4% by weight, based on the weight of the polyurethane composite. In some embodiments, the polyurethane composite is free of fiber material dispersed within the polyurethane composite.

The polyurethane composites described herein can comprise additional materials. The additional materials can include an organic filler, such as a recycled polymeric material. Suitable examples include pulverized polymeric foam or recycled rubber material. Additional components useful with the polyurethane composites can include foaming agents, blowing agents, surfactants, chain-extenders, crosslinkers, coupling agents, UV stabilizers, fire retardants, antimicrobials, anti-oxidants, and pigments. Though the use of such components is well known to those of skill in the art, some of these additional additives are further described herein.

Chemical foaming agents include azodicarbonamides (e.g., Celogen manufactured by Lion Copolymer Geismar); and other materials that react at the reaction temperature to form gases such as carbon dioxide. Water is an exemplary foaming agent that reacts with isocyanate to yield carbon dioxide. The presence of water as an added component or in the filler also can result in the formation of polyurea bonds through the reaction of the water and isocyanate. In some embodiments, water may be present in the mixture used to produce the polyurethane composite in an amount of from greater than 0% to 5% by weight or less, based on the weight of the mixture. In some embodiments, water can be present in a range of 0.02% to 4%, 0.05% to 3%, 0.1% to 2%, or 0.2% to 1% by weight, based on the weight of the mixture. In some embodiments, the mixture used to produce the polyurethane composite includes less than 0.5% by weight water.

Surfactants can be used as wetting agents and to assist in mixing and dispersing the materials in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants. For example, silicone surfactants such as Tegostab B-8870, DC-197 and DC-193 (Air Products; Allentown, Pa.) can be used.

Low molecular weight reactants such as chain-extenders and/or crosslinkers can be included in the composite described herein. These reactants help the polyurethane composite to distribute and contain the fiber material and/or particulate filler within the composite. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some composites, a crosslinker or chain-extender may be used to replace at least a portion of the one or more polyols in the composite material. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the polyurethane composite material. Coupling agents can allow higher filler loadings of the particulate filler such as fly ash, and/or fiber material, and may be used in small quantities. For example, the polyurethane composite may comprise about 0.01 wt % to about 0.5 wt % of a coupling agent. Examples of coupling agents useful with the composite materials described herein include Ken-React LICA 38 and KEN-React KR 55 (Kenrich Petrochemicals; Bayonne, N.J.). Examples of dispersing agents useful with the composite materials described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the polyurethane composites described herein. Examples of UV light stabilizers include hindered amine type stabilizers and opaque pigments like carbon black powder. Fire retardants can be included to increase the flame or fire resistance of the composite material. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the composite materials described herein. An example of a pigment is iron oxide, which can be added in amounts ranging from about 2 wt % to about 7 wt %, based on the total weight of the polyurethane composite.

The polyurethane composite can have a thickness of 0.125 inches to 3 inches. For example, the fiber reinforcement can have an average thickness of 0.125 inches to 2 inches, 0.25 inches to 1 inch, or 0.25 inches to 0.5 inches.

In some embodiments, the density of the polyurethane composite described herein can be 2 lb/ft$^3$ or greater. For example, the density of the polyurethane composite can be 2 lb/ft$^3$ to 75 lb/ft$^3$, 2 lb/ft$^3$ to 60 lb/ft$^3$, 5 lb/ft$^3$ to 60 lb/ft$^3$, 35 lb/ft$^3$ to 50 lb/ft$^3$, 35 lb/ft$^3$ to 60 lb/ft$^3$, 2 lb/ft$^3$ to 30 lb/ft$^3$, 10 lb/ft$^3$ to 35 lb/ft$^3$, 15 lb/ft$^3$ to 35 lb/ft$^3$ or 20 lb/ft$^3$ to 40 lb/ft$^3$.

As described herein, a fiber reinforcement is also included on one or more surfaces of the polyurethane composite in the composite panel. In some embodiments, the composite panel includes a first fiber reinforcement on a first surface of the polyurethane composite. In some embodiments, the composite panel includes a first fiber reinforcement on a first surface of the polyurethane composite and a second fiber reinforcement on a second surface, opposite the first surface, of the polyurethane composite.

The fiber reinforcement can include any of the fiber materials as described herein and can include a blend of different fibers (either type or size). In some embodiments, the fiber reinforcement can include glass fibers. In some embodiments, the fibrous glass is a low alkalinity fiber such as an E-glass fiber. The fiber reinforcement can be woven or non-woven. In some embodiments, the fiber reinforcement can be present in the form of individual fibers, chopped fibers, bundles, strings such as yarns, fabrics, scrims, papers, rovings, mats, or tows.

The fibers in the reinforcement can have an average diameter of 100 microns or less. For example, the fibers in the fiber reinforcement can have an average diameter of 1 μm or greater, 2 μm or greater, 3 μm or greater, 4 μm or greater, 5 μm or greater, 10 μm or greater, 15 μm or greater, 20 μm or greater, 25 μm or greater, 30 μm or greater, 40 μm or greater, 50 μm or greater, 60 μm or greater, 70 μm or greater, 80 μm or greater, 90 μm or greater, or 100 μm or greater. In some embodiments, the fibers in the fiber reinforcement can have an average diameter of 90 μm or less, 80 μm or less, 70 μm or less, 60 μm or less, 50 μm or less, 40 μm or less, 30 μm or less, 25 μm or less, or 20 μm or less. In certain embodiments, the fibers in the fiber reinforcement can have an average diameter of from 1 μm to 100 μm, 1 μm to 70 μm, 1 μm to 50 μm, 1 μm to 25 μm, 5 μm to 100 μm, 5 μm to 50 μm, 5 μm to 25 μm, or 5 μm to 20 μm.

The thickness of the fiber reinforcement in the composite panel can be any suitable thickness to reinforce the composite panel. In some embodiments, the average thickness of the fiber reinforcement can be 0.1 inch or less. For example, the fiber reinforcement can have an average thickness of 0.07 inch or less, 0.05 inch or less, 0.03 inch or less, 0.01 inch or less, 0.005 inch or less, or 0.001 inch or less. In some embodiments, the fiber reinforcement can have an average thickness of 0.001 inch or greater, 0.005 inch or greater, 0.01 inch or greater, 0.03 inch or greater, 0.05 inch or greater, or 0.07 inch or greater. In some embodiments, the fiber reinforcement can have an average thickness of from 0.001 inch to 0.1 inch or from 0.001 inch to 0.05 inch.

The fiber reinforcement can have a basis weight of 20 g/ft$^2$ or less. In some embodiments, the fiber reinforcement can have a basis weight of 17 g/ft$^2$ or less, 15 g/ft$^2$ or less, 12 g/ft$^2$ or less, 10 g/ft$^2$ or less, 9 g/ft$^2$ or less, 8 g/ft$^2$ or less, 7 g/ft$^2$ or less, 6 g/ft$^2$ or less, or 5 g/ft$^2$ or less. In some embodiments, the fiber reinforcement can have a basis weight of 0.5 g/ft$^2$ or greater, 1 g/ft$^2$ or greater, 2 g/ft$^2$ or greater, 3 g/ft$^2$ or greater, 4 g/ft$^2$ or greater, 5 g/ft$^2$ or greater, 7 g/ft$^2$ or greater, or 10 g/ft$^2$ or greater. In some embodiments, the fiber reinforcement can have a basis weight of from 0.5 g/ft$^2$ to 20 g/ft$^2$, from 0.5 g/ft$^2$ to 15 g/ft$^2$, from 0.5 g/ft$^2$ to 10 g/ft$^2$, from 1 g/ft$^2$ to 10 g/ft$^2$, or from 1.5 g/ft$^2$ to 10 g/ft$^2$.

As described herein, the composite panel can include a cementitious material. In some embodiments, the cementitious material can form a layer adjacent the first fiber reinforcement, opposite the polyurethane composite. The cementitious material can include any suitable material for forming a cementitious layer with the desirable properties. In some embodiments, the cementitious material includes a rapid set cement. The rapid set cement can include calcium aluminate cement (CAC), calcium phosphate cement, calcium sulfate hydrate, calcium sulfoaluminate (CSA) cement, magnesium oxychloride cement, magnesium oxysulfate cement, magnesium phosphate cement, or combinations thereof. In some embodiments, the cementitious material can include Portland cement. The rapid set cement and/or the Portland cement can be present in an amount of 50% or greater by weight, e.g., 60% or greater, 70% or greater, 80% or greater, or 90% or greater by weight, based on the total weight of the cementitious material. In some embodiments, the cementitious material does not include gypsum (calcium sulfate hydrate).

In some embodiments, the cementitious material can include an inorganic polymer formed by reacting a reactive powder and an activator in the presence of water. Suitable inorganic polymers are described in U.S. Patent No. U.S. Patent Application No. 2014/0349104, which is herein incorporated by reference. In some embodiments, the reactive powder for use in the cementitious material includes fly ash. In some examples, the majority of the fly ash present is Class C fly ash (i.e., greater than 50% of the fly ash present is Class C fly ash).

The fly ash is the principal component of the reactive powder and can be present in an amount of greater than 50% by weight, 65% by weight or greater, 75% by weight or greater, or 85% by weight or greater of the reactive powder. In some examples, the fly ash is present in an amount of 90% by weight or greater of the reactive powder or 95% by weight or greater of the reactive powder. For example, the fly ash can be present in an amount of 85% by weight or greater, 86% by weight or greater, 87% by weight or greater, 88% by weight or greater, 89% by weight or greater, 90% by weight or greater, 91% by weight or greater, 92% by weight or greater, 93% by weight or greater, 94% by weight or greater, 95% by weight or greater, 96% by weight or greater, 97% by weight or greater, 98% by weight or greater, or 99% by weight or greater based on the weight of the reactive powder. In some embodiments, the reactive powder consists of fly ash.

The reactive powder for use as a reactant to form the inorganic polymer compositions can further include other cementitious components. In some embodiments, the reactive powder can include a rapid set cement as described herein. In some embodiments, the reactive powder can include Portland cement. In some embodiments, the reactive powder further includes slag. In some embodiments, the reactive powder further includes sand. In some embodiments, the reactive powder includes Portland cement, calcium aluminate cement, calcium sulfoaluminate cement, and/or slag. In these examples, the reactive powder can include 10% or less by weight of the other cementitious material. In some examples, the reactive powder includes 5% by weight or less, 3% by weight or less, or 1% by weight or less of other cementitious material. For example, the reactive powder can include the other cementitious material cement in an amount of 10% or less by weight, 9% or less by weight, 8% or less by weight, 7% or less by weight, 6% or less by weight, 5% or less by weight, 4% or less by weight, 3% or less by weight, 2% or less by weight, 1% or less by weight, or 0.5% or less by weight. In some examples, the reactive powder is substantially free from other cementitious material. For example, the reactive powder can include less than 0.1% by weight, less than 0.01% by weight, or less than 0.001% by weight of Portland cement based on the weight of the reactive powder. In some embodiments, the reactive powder includes no Portland cement.

The reactive powder can also include a ground slag such as blast furnace slag in an amount of 10% or less by weight. For example, the reactive powder can include slag in an amount of 10% or less, 9% or less, 8% or less, 7% or less, 6% or less, 5% or less, 4% or less, 3% or less, 2% or less, or 1% or less by weight.

An activator is a further reactant used to form the inorganic polymer compositions described herein. The activator allows for rapid setting of the inorganic polymer compositions and also imparts compressive strength to the compositions. The activator can include one or more of acidic, basic, and/or salt components. For example, the activator can include citrates, hydroxides, metasilicates, carbonates, aluminates, sulfates, and/or tartrates. The activator can also include other multifunctional acids that are capable of complexing or chelating calcium ions (e.g., EDTA). Specific examples of suitable citrates for use as activators include citric acid and its salts, including, for example, sodium citrate and potassium citrate. Specific examples of suitable tartrates include tartaric acid and its salts (e.g., sodium tartrate and potassium tartrate). In some examples, the activator can include alkali metal hydroxides, such as sodium hydroxide and potassium hydroxide. Further examples of suitable activators include metasilicates (e.g., sodium metasilicate and potassium metasilicate); carbonates (e.g., sodium carbonate and potassium carbonate); aluminates (e.g., sodium aluminate and potassium aluminate); and sulfates (e.g., sodium sulfate and potassium sulfate). In some examples, the activator includes citric acid, tartaric acid, or mixtures thereof. In some examples, the activator includes sodium hydroxide. In some examples, the activator includes a mixture of citric acid and sodium hydroxide. In examples including a mixture of citric acid and sodium hydroxide, the weight ratio of citric acid present in the mixture to sodium hydroxide present in the mixture is from 0.4:1 to 2.0:1, 0.6:1 to 1.9:1, 0.8:1 to 1.8:1, 0.9:1 to 1.7:1, or 1.0:1 to 1.6:1. The activator components can be pre-mixed prior to being added to the other reactive components in the inorganic polymer or added separately to the other reactive components. For example, citric acid and sodium hydroxide could be combined to produce sodium citrate and the mixture can include possibly one or more of citric acid and sodium hydroxide in stoichiometric excess. In some embodiments, the activator includes a stoichiometric excess of sodium hydroxide. The total amount of activators can include less than 95% by weight of citrate salts. For example, the total amount of activator can include from 25-85%, 30-75%, or 35-65% citrate salts by weight. The mixture in solution and the mixture when combined with the reactive powder can have a pH of from 12 to 13.5 or about 13.

The activator can be present as a reactant in an amount of from 1.5% to 8.5% dry weight based on the weight of the reactive powder. For example, the activator can be present in an amount of from 2% to 8%, from 3% to 7%, or from 4% to 6%. In some examples, the activator can be present in an amount of 1.5%, 2%, 2.5%, 3%, 3.5%, 4%, 4.5%, 5%, 5.5%, 6%, 6.5%, 7%, 7.5%, 8% or 8.5% dry weight based on the weight of the reactive powder. For example, when sodium hydroxide and citric acid are used as the activators, the amount of sodium hydroxide used in the activator solution can be from 0.3 to 15.6, 0.5 to 10, 0.75 to 7.5, or 1 to 5 dry parts by weight based on the weight of reactive powder and the amount of citric acid used in the activator solution can be from 0.25 to 8.5, 0.5 to 0.7, 0.75 to 0.6, or 1 to 4.5 dry parts by weight based on the weight of reactive powder. The resulting activator solution can include sodium citrate and optionally one or more of citric acid or sodium hydroxide.

The activator can be provided, for example, as a solution. In some examples, the activator can be provided in water as an aqueous solution in a concentration of from 10% to 50% or from 20% to 40% based on the weight of the solution. For example, the concentration of the activator in the aqueous solution can be from 25% to 35% or from 28% to 32% based on the weight of the solution. Examples of suitable concentrations for the activator in the aqueous solution include 10%, 15%, 20%, 25%, 30%, 35%, 40%, 45%, or 50% based on the weight of the solution.

The inorganic polymer compositions described herein are prepared in the presence of aerating agents, including blowing agents and foaming agents. Examples of suitable blowing agents include aluminum powder, perborates (e.g., sodium perborate), peroxides (e.g., $H_2O_2$ or an organic peroxide), and chloride dioxide. The blowing agent can be present in an amount of from 0.1% to 10% by weight of the reactive powder. The aerating agents described herein can also include foaming agents. In some examples, the foaming agent can be an air-entraining agent. Foaming agents can be used to help the system maintain air or other gases, e.g., from the mixing process. The foaming agents can include non-ionic surfactants, anion surfactants, and/or cationic surfactants. Examples of suitable foaming agents include sodium alkyl ether sulfate, ammonium alkyl ether sulfate, sodium alpha olefin sulfonate, sodium deceth sulfate, ammonium deceth sulfate, sodium laureth sulfate, and sodium dodecylbenzene sulfonate. The foaming agents can be provided in an amount of 0.1% or less based on the weight of the reactive powder. In some examples, the foaming agents can be included in the compositions in an amount of from 0.001% by weight to 0.1% by weight or from 0.005% by weight to 0.05% by weight (e.g., 0.01% by weight).

The reactants to form the inorganic polymer compositions are reacted in the presence of water. The water can be provided in the reactive mixture by providing the activator in solution and/or by adding water directly to the reactive mixture. The solution to binder or solution to reactive powder weight ratio (i.e., the ratio of the solution including activator to reactive powder) can be from 0.09:1 to 0.5:1, depending on the product being made and the process being used for producing the product.

The reactants used to form the inorganic polymer compositions can further include a retardant. Retardants are optionally included to prevent the composition from stiffening too rapidly, which can result in a reduction of strength in the structure. Examples of suitable retardants for inclusion as reactants include borax, boric acid, gypsum, phosphates, gluconates, or a mixture of these. In some examples, the retardant is present in an amount of from 0.4% to 7.5% based on the weight of the reactive powder.

The cementitious material can include a filler, such as those described herein. In some examples, the cementitious material can include a rapid set cement, Portland cement, and a filler such as fly ash, slag, sand, or combinations thereof. In some embodiments, the cementitious material can include a rapid set cement and a filler such as fly ash, slag, or sand. In some examples, the cementitious material can include Portland cement and a filler. In some examples, the cementitious material consists or consists essentially of a rapid set cement, a filler in an amount of 30% or less by weight (e.g., 25% or less by weight, or 20% or less by weight), based on the total weight of the cementitious material, and optionally Portland cement. In some examples, the filler (e.g., fly ash, slag, sand, or combinations thereof) can be present in an amount of from 5% to 30% by weight, based on the total weight of the cementitious material. In some examples, the filler can include a lightweight filler.

In some embodiments, a cementitious material can include a fiber material, e.g., to provide increased strength, stiffness or toughness. In some examples, fire resistant or retardant glass fibers can be included to impart fire resistance or retarding properties to the cementitious material. Suitable fiber materials useful with the cementitious material are described herein. The fibers can be included in an amount of 0.1% to 6% based on the weight of the cementitious material.

Additional components useful with the cementitious material described herein include air entraining agents, water reducers, plasticizers, pigments, anti-efflorescence agents, ultraviolet light stabilizers, retardants including fire retardants, antimicrobials, and antioxidants. Air entraining agents can be used to entrain air in the cementitious material thereby reducing the density of the cementitious material. Water reducers can be included in the compositions described herein to reduce the amount of water in the composition while maintaining the workability, fluidity, and/or plasticity of the composition. In some examples, the water reducer is a high-range water reducer, such as, for example, a superplasticizer admixture. Examples of suitable water reducers include lignin, naphthalene, melamine, polycarboxylates, lignosulfates and formaldehyde condensates (e.g., sodium naphthalene sulfonate formaldehyde condensate). Water reducers can be provided in an amount of from greater than 0 to 1% by weight based on the weight of the cementitious material.

The cementitious material can further include a photocatalyst. Photocatalysts are optionally included for the reduction of nitrogen oxides (NOx) and self-cleaning. In some embodiments, the cementitious material can include titanium dioxide. Example of suitable photocatalyst includes titanium dioxide. In some embodiments, the photocatalyst can be dispersed within the cementitious material. In some embodiments, the photocatalyst can be present as a coating on the cementitious material. In some examples, the titanium dioxide can be provided as a coating on the cementitious material and is present in an amount of from 1% to 10% based on the weight of the coating on the cementitious material.

The cementitious material can be any suitable thickness to confer a desirable property to the composite panel, e.g., to provide increased strength, handleability, stiffness or toughness. In some embodiments, the thickness of the cementitious material can be 0.5 inch or less. For example, the cementitious material can have an average thickness of 0.4 inch or less, 0.3 inch or less, 0.25 inch or less, 0.20 inch or less, or 0.15 inch or less. In some embodiments, the cementitious material can have an average thickness of 0.005 inch or greater, 0.01 inch or greater, 0.05 inch or greater, or 0.1 inch or greater. In some embodiments, the cementitious layer can have an average thickness of from 0.005 inch to 0.25 inch or from 0.005 inch to 0.20 inch.

In some embodiments, the fiber material (including the fiber reinforcement), the cementitious material, and/or the particulate filler such as fly ash can be coated with a composition to modify their reactivity. For example, the fiber material, the cementitious material, and/or the particulate filler can be coated with a sizing agent such as a coupling agent (compatibilizer). In some embodiments, the fiber material, the cementitious material, and/or the particulate filler can be coated with a composition for promoting adhesion. U.S. Pat. No. 5,064,876 to Hamada et al. and U.S. Pat. No. 5,082,738 to Swofford, for example, disclose compositions for promoting adhesion. U.S. Pat. No. 4,062,999 to Kondo et al. and U.S. Pat. No. 6,602,379 to Li et al. describe suitable aminosilane compounds for coating fibers. In some embodiments, the fiber material, the cementitious material, and/or the particulate filler are surface coated with a composition comprising a silane compound such as aminosilane. In some embodiments, the fiber material, the cementitious material, and/or the particulate filler are surface coated with a composition comprising an oil, starch, or a combination thereof.

As described herein, the composite panel can include a first fiber reinforcement on a first surface of the polyurethane composite and a second fiber reinforcement on a second surface, opposite the first surface, of the polyurethane composite. In some embodiments, the composite panel can include a first fiber reinforcement on a first surface of the polyurethane composite and a material, other than a fiber reinforcement, on a second surface of the polyurethane composite. In some embodiments, the material can include a cementitious layer, a paper sheet, a metal sheet, a polymeric layer, or a combination thereof. Suitable materials that can be included on the second surface of the polyurethane composite include an aluminum sheet, an aluminum-plated sheet, a zinc sheet, a zinc-plated sheet, an aluminum/zinc alloy sheet, an aluminum/zinc alloy-plated sheet, a stainless steel sheet, craft paper, a polymeric surfacing film, or a combination thereof.

Methods of preparing the composite panels are described herein. The composite panels can be produced using a batch, semi-batch, or continuous process. In some embodiments, the method can include forming a polyurethane mixture. The polyurethane mixture can be produced by mixing the one or more isocyanates, the one or more polyols, and the particulate filler in a mixing apparatus. The materials can be added in any suitable order. For example, in some embodiments, the mixing stage of the method used to prepare the polyurethane composite can include: (1) mixing the polyol and particulate filler; (2) mixing the isocyanate with the polyol, and particulate filler; and optionally (3) mixing the catalyst with the isocyanate, the polyol, and the particulate filler. The optional fiber material can be added at the same time as the particulate filler, or can be added prior to, during, or after stage (2) or (3).

The polyurethane composite mixture can be blended in any suitable manner to obtain a homogeneous or heterogeneous blend of the one or more isocyanate, the one or more polyols, the particulate filler, and the optional fiber material and catalyst. In some embodiments, mixing can be conducted in a high speed mixer or an extruder an extruder. An ultrasonic device can be used for enhanced mixing and/or wetting of the various components of the composite. The ultrasonic device produces an ultrasound of a certain frequency that can be varied during the mixing and/or extrusion process. The ultrasonic device useful in the preparation of composite panels described herein can be attached to or adjacent to the extruder and/or mixer. For example, the ultrasonic device can be attached to a die or nozzle or to the port of the extruder or mixer. An ultrasonic device may provide de-aeration of undesired gas bubbles and better mixing for the other components, such as blowing agents, surfactants, and catalysts.

The method of making the composite panels can include allowing the one or more isocyanates and the one or more polyols to react in the presence of the particulate filler to form a polyurethane composite having a first surface and a second surface opposite the first surface. The curing stage of the method used to prepare the polyurethane composite can be carried out in a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. In some embodiments, a molded article can then be formed prior to the additional method steps in forming the composite panel.

In some embodiments, the polyurethane mixture can be foamed. The polyols and the isocyanate can be allowed to produce a foamed composite material after mixing the components according to the methods described herein. The polyurethane composite can be formed while they are actively foaming or after they have foamed. For example, the polyurethane composite can be placed under the pressure of a mold cavity prior to or during the foaming of the polyurethane composite.

The method of making the composite panels can include applying a first fiber reinforcement to a surface of the polyurethane composite. In some embodiments, the fiber reinforcement can be applied to the polyurethane composite before it has completely cured, such that at least a portion of the fiber reinforcement becomes embedded in the polyurethane composite. For example, the fiber reinforcement can be applied to the polyurethane mixture after the mixture is fed to the mold. In some embodiments, the fiber reinforcement can be applied to the mold prior to the polyurethane mixture being fed into the mold and can become embedded prior to the full curing of the polyurethane mixture. In some embodiments, the fiber reinforcement can be applied to the polyurethane composite after the polyurethane composite has been cured. For example, an adhesive can be applied to bond the fiber reinforcement to the polyurethane composite. The adhesive can be applied by spray coating, curtain coating, brushing, roller coating, dip coating, spin coating, or flow coating. Suitable adhesives include an adhesive derived from ethylene vinyl acetate, acrylic, urethane, epoxy, starch, gum, resin (such as gum arabic, gum tragacanth, rubber or shellac), or combinations thereof.

The method can further include applying a cementitious material to the fiber reinforcement. The cementitious material can be in the form of a cementitious slurry. The cementitious slurry can be applied by roller coating, curtain coating, dip coating, brushing, with a trowel, or spraying. In some embodiments, the application of the cementitious material can be vacuum assisted. In some embodiments, the method can include applying the cementitious slurry to the fiber reinforcement, after applying the fiber reinforcement to the polyurethane composite. In some embodiments, the cementitious material and the fiber reinforcement can be applied to the polyurethane composite simultaneously. For example, the method can include applying a cementitious slurry to the fiber reinforcement prior to applying the fiber reinforcement to the polyurethane composite. In this example, at least a portion of the fiber reinforcement becomes embedded in the cementitious material.

In some embodiments, the method can include applying the cementitious slurry to the polyurethane composite, prior to applying the fiber reinforcement to the polyurethane composite.

The method of making the composite panels can include applying an adhesive to the fiber reinforcement or the polyurethane composite prior to applying the cementitious material to facilitate bonding of the cementitious material. The adhesive can be applied by spray coating, curtain coating, brushing, roller coating, dip coating, spin coating, or flow coating. Suitable adhesives are described herein.

In some embodiments, the method can include applying a water and/or water vapor barrier prior to applying the cementitious material. For example, the adhesive can produce a water and/or water vapor barrier. Alternatively, a water and/or water vapor barrier film or other material can be applied prior to applying the cementitious material.

In some embodiments, the cementitious material, the first fiber reinforcement, and the polyurethane composite are directly adhered without the use of an adhesive layer. In embodiments wherein the cementitious slurry and the first fiber reinforcement are directly bonded to a fly ash-filled polyurethane composite, it has been discovered that the cementitious slurry forms mechanical bonds with the fly ash present in the polyurethane composite thereby enhancing the bonding of the cementitious slurry and the first fiber reinforcement to the polyurethane composite.

In some embodiments, the method can include applying a liquid to a surface of the polyurethane composite to activate the cementitious slurry. In certain embodiments, the liquid can be an aqueous solution having a pH of 6.5 or greater. The liquid optionally includes an activator. Suitable activators are described herein.

In some embodiments, incorporation of the fiber reinforcement and/or the cementitious layer onto the filled polyurethane composite can maintain similar or improved physical properties and mechanical performance such as flexural strength, hardness, stiffness, flame resistance, and handleability of such materials, when the fiber material is excluded from or included in minor amounts the polyurethane composite. The optimization of various properties of the composite panels, such as hardness, stiffness, flexural strength, handleability, and flame resistance of the composite allows their use in building materials and other structural applications. For example, the composite panels can be formed into shaped articles and used in building materials. Suitable building materials include building panels, tile backer board, sheathing, roofing products, siding materials, sheets, sound barrier/insulation, thermal barriers, insulation, decking materials, fencing materials, cladding, or other shaped articles. Examples of shaped articles made using the composite panels described herein include roof tiles such as roof tile shingles, roof cover boards, slate panels, shake panels, cast molded products, moldings, sills, stone, masonry, brick products, posts, signs, guard rails, retaining walls, park benches, tables, slats, corner arches, columns, wall boards, ceiling tiles, ceiling boards, soffits, or railroad ties.

In some embodiments, incorporation of the cementitious layer and the fiber reinforcement on the filled polyurethane composite provides enhanced bonding to polymeric and cementitious adhesives/grouts used for bonding tile. Without wishing to be bound by theory, an effective tile substrate needs to absorb some moisture from the grout to increase the intimacy of the bond and to remove moisture for curing. On the other hand, the tile substrate also needs to be a good barrier to water. The composite panels described herein comprises a polyurethane composite that can serve as a water barrier while the cementitious material can serve as a surface that will wet and adhere with the grout and bonding agents. Further, the polyurethane composite under the hard cement layer provides enhanced impact resistant and compressive strength than other foam based products. For this reason, the composite panels can be used in flooring applications.

In some embodiments, incorporation of the fiber reinforcement on the filled polyurethane composite can increase the flexural strength of the composite, compared to a composite without the fiber reinforcement. In some embodiments, the flexural strength of the polyurethane composites can be increased by at least 10%, for example, 15% or greater, 20% or greater, 25% or greater, 30% or greater, 35% or greater, 50% or greater, 75% or greater, or even 100% or greater, compared to a composite without the fiber reinforcement. The flexural strength of the composite panels described herein can be 200 psi or greater (e.g., up to 1600 psi). For example, the flexural strength of the composite panels can be 300 psi or greater, 500 psi or greater, 700 psi or greater, 900 psi or greater, 1000 psi or greater, 1100 psi or greater, 1200 psi or greater, 1300 psi or greater, 1400 psi or greater, or 1500 psi or greater. The flexural strength can be determined by the load required to fracture a rectangular prism loaded in the three point bend test as described in ASTM C1185-08 (2012).

In some embodiments, incorporation of the fiber reinforcement and the cementitious layer on the filled polyurethane composite can increase the hardness of the composite, compared to a composite without the fiber reinforcement and the cementitious layer. In some embodiments, the Shore D hardness of the composite panels described herein can be 50 or greater (e.g., up to 90). For example, the Shore D hardness of the composite panels can be 55 or greater, 60 or greater, 65 or greater, 75 or greater, or 80 or greater. The Shore D hardness can be determined using a durometer as described in ASTM D2240.

In some embodiments, incorporation of the fiber reinforcement and the cementitious layer on the polyurethane composite can increase the stiffness of the composite, compared to a composite without the fiber reinforcement and the cementitious layer. In some embodiments, the modulus of elasticity (stiffness) of the composite panel can be 10 ksi or greater, 50 ksi or greater or 100 ksi or greater. For example, the modulus of elasticity can be from 10 to 500 ksi or from 50 to 500 ksi. The modulus of elasticity can be determined as described in ASTM C1185-08.

In some embodiments, incorporation of the fiber reinforcement and the cementitious layer on the filled polyurethane composite can increase the flame resistance of the composite, compared to a composite without the fiber reinforcement and the cementitious layer. In some embodiments, the composite panels can be qualified as a Class A material in the ASTM E84 tunnel test. In some embodiments, the composite panels have a flame spread rating of 25 or less and a smoke development rating of 450 or less. The flame spread and smoke development ratings can be determined as described in the ASTM E84 test.

In some embodiments, inorganic fiber materials can be excluded or included in amounts of less than 4% by weight of the polyurethane composite, which results in a decrease in the viscosity of the polyurethane mixture, and thus improves the processability of such materials and products. In some embodiments, it is desirable that the polyurethane mixture has a viscosity below a particular threshold at the desired loadings so it can be effectively processed. In some embodiments, the amount of fiber material can be present in the composite mixture in amounts to produce a workable viscosity (initial viscosity) of from 25 Pa·s to 250 Pa·s. For example, the fiber material in the polyurethane mixture can be in amounts to produce a workable viscosity from 30 Pa·s to 250 Pa·s, 65 Pa·s to 250 Pa·s, or 80 Pa·s to 250 Pa·s. The viscosity of the composite mixture can be measured using a Thermo Electron Corporation Haake Viscometer.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the disclosure. Unless indicated otherwise, parts and percentages are on a weight basis, temperature is in ° C. or is at ambient temperature, and pressure is at or near atmospheric.

Mechanical Properties of Filled Polyurethane Composites With Various Combinations of Glass Fiber Reinforcement Preparation of polyurethane composite: Polyurethane composites were prepared using four different glass fiber reinforcements with varying thicknesses and weights labeled as 260-F, 1581-A, or 241-F. 260-F refers to a woven glass fiber fabric reinforcement having a thickness of 0.01 inch and a weight of 3.7 g/sqft; 1581-A refers to a woven glass fiber fabric reinforcement having a thickness of 0.01 inch and a weight of 3.8 g/sqft; and 241-F refers to a woven glass fiber fabric reinforcement having a thickness of 0.004 inch and a weight of 6.3 g/sqft. 260-F, 1581-A, and 241-F were obtained from FibreGlast, Ohio, USA.

The composites were prepared by mixing a polyol blend containing 6% by weight CARPOL® MX-470 and 94% by weight TEROL® 198 to produce a polyol mixture. The polyol mixture was then mixed with 1% by weight of an amine catalyst (diethanolamine), and 2% by weight of a silicone surfactant (Tegostab B-8870) in an extruder. Fly ash and glass fibers, in the amounts described below, were added and wetted with the liquid solution. Methylene diphenyl diisocyanate (MDI; 104 index; 51.5 g) was then added to the extruder, and simultaneously stirring began. The mixture was extruded into a belt molding system and allowed to cure. The glass fiber reinforcement was applied prior to/after extruding in the molding system, to both surfaces of the composite, unless otherwise specified. The physical properties of the composites, including flexural strength, density, handleability, extension, and modulus were determined. The handleability is a measure of the ability of the material to be flexed during use and is calculated as 0.5×breaking load× ultimate deflection/thickness of the test specimen. The extension is a measure of the elongation of a sample during the three point bend test as defined in ASTM C1185. The modulus is calculated as the stress/strain from the three point bend test. Normalized flexural strength is the ratio of flexural strength divided by the density.

TABLE 1

Mechanical properties of filled polyurethane composites (73 wt % fly ash, 23 wt % polyurethane, and 4 wt % glass fiber) with various types of glass fiber reinforcement. The control samples do not include a glass fiber reinforcement.

| Sample ID | Normalized Flexural Strength, psi/pcf | Flexural Strength, psi | Density, pcf | Modulus, ksi | Handleability, lbf-in/in | Extension, in | Increase in flexural strength | Increase in handleability |
|---|---|---|---|---|---|---|---|---|
| 260-F Control | 38.3 | 1802 | 47.0 | 194 | 9.4 | 0.051 | / | |
| 260-F | 56.4 | 2813 | 49.9 | 186 | 26.4 | 0.084 | 47% | 182% |
| 1581-A Control | 43.2 | 2027 | 46.9 | 252 | 9.6 | 0.047 | / | |
| 1581-A | 46.0 | 2278 | 49.5 | 151 | 21.4 | 0.082 | 6% | 122% |
| 241-F Control | 50.3 | 2532 | 50.3 | 274 | 14.0 | 0.054 | / | |
| 241-F | 48.9 | 2460 | 50.3 | 162 | 22.8 | 0.081 | −3% | 63% |

TABLE 2

Mechanical properties of filled polyurethane composites (75 wt % fly ash, 23 wt % polyurethane, and 2 wt % glass fiber) with various types of glass fiber reinforcement. The control samples do not include a glass fiber reinforcement.

| Sample ID | Normalized Flexural Strength, psi/pcf | Flexural Strength, psi | Density, pcf | Modulus, ksi | Handleability, lbf-in/in | Extension, in | Increase in flexural strength | Increase in handleability |
|---|---|---|---|---|---|---|---|---|
| 260-F Control | 37.8 | 1758 | 46.5 | 211 | 8.4 | 0.046 | / | / |
| 260-F | 47.4 | 2284 | 48.2 | 185 | 17.4 | 0.068 | 25% | 108% |
| 1581-A Control | 30.3 | 1374 | 45.4 | 171 | 6.2 | 0.044 | / | / |
| 1581-A | 39.9 | 1850 | 46.3 | 145 | 14.4 | 0.068 | 32% | 133% |
| 241-F Control | 35.1 | 1710 | 48.7 | 207 | 8.0 | 0.045 | / | / |
| 241-F | 42.2 | 2020 | 47.9 | 160 | 15.4 | 0.067 | 20% | 92% |

TABLE 3

Mechanical properties of filled polyurethane composites (77 wt % fly ash and 23 wt % polyurethane) with various types of glass fiber reinforcement. The control samples do not include a glass fiber reinforcement.

| Sample ID | Normalized Flexural Strength, psi/pcf | Flexural Strength, psi | Density, pcf | Modulus, ksi | Handleability, lbf-in/in | Extension, in | Increase in flexural strength | Increase in handleability |
|---|---|---|---|---|---|---|---|---|
| Control | 4.3 | 106 | 24.5 | 9 | 0.8 | 0.070 | / | / |
| Control with Clean Wrap Elastomer on One Side | 7.4 | 201 | 27.3 | 22 | 1.6 | 0.074 | 70% | 106% |
| 260-F Control | 6.1 | 153 | 25.1 | 23 | 0.6 | 0.023 | / | / |
| 260-F | 43.4 | 1263 | 29.1 | 76 | 18.0 | 0.036 | 612% | 2900% |
| 1581-A Control | 5.0 | 125 | 24.7 | 14 | 0.6 | 0.025 | / | / |
| 1581-A | 27.0 | 743 | 27.5 | 60 | 7.4 | 0.028 | 436% | 1067% |

TABLE 4

Mechanical properties of filled polyurethane composites (73 wt % fly ash, 23 wt % polyurethane, and 4 wt % glass fiber) with various types of glass fiber reinforcement.

| Sample ID | Normalized Flexural Strength, psi/pcf | Flexural Strength, psi | Density, pcf | Modulus, ksi | Handleability, lbf-in/in | Extension, in | Increase in flexural strength | Increase in handleability |
|---|---|---|---|---|---|---|---|---|
| Control | 23.1 | 585 | 25.3 | 47 | 4.8 | 0.079 | / | / |
| Control with Clean Wrap Elastomer on Both Sides | 26.6 | 800 | 30.1 | 65 | 7.0 | 0.079 | 15% | 45% |
| 260-F Control | 28.0 | 858 | 30.7 | 46 | 11.9 | 0.124 | / | / |
| 260-F on One Side | 41.7 | 1243 | 29.8 | 66 | 24.0 | 0.177 | 49% | 102% |
| 260-F Control | 18.8 | 460 | 24.5 | 35 | 4.0 | 0.079 | / | / |
| 260-F-1 | 52.3 | 1624 | 31.1 | 93 | 19.9 | 0.109 | 178% | 398% |
| 260-F-2 | 50.2 | 1645 | 32.7 | 102 | 20.3 | 0.109 | 167% | 408% |
| 260-F-3 | 53.8 | 1692 | 31.5 | 102 | 21.9 | 0.114 | 186% | 449% |
| 1581-A Control | 30.0 | 828 | 27.6 | 65 | 7.2 | 0.082 | / | / |
| 1581-A | 38.4 | 1298 | 33.8 | 87 | 15.1 | 0.103 | 28% | 110% |
| 241-F Control | 26.0 | 749 | 28.8 | 58 | 6.2 | 0.080 | / | / |
| 241-F | 40.9 | 1424 | 34.8 | 99 | 14.4 | 0.089 | 57% | 133% |

Summary: Compared to its use in normal-weight materials, the application of the fiber reinforcement had more enhancing effect on the highly-filled polyurethane composite materials. Table 3 shows that, when different glass fiber reinforcements were used on both sides of a control formulation without glass fiber in the body, the flexural strength increased up to 612% and the handleability increased up to 2900%. In addition, the mix with 260-F reinforcement exhibited a high flexural strength of 1263 psi and a high handleability of 18. Similarly, there was also up to a 186% increase in flexural strength and up to a 449% increase in handleability when glass fiber reinforcements were used for formulations with 73 wt % fly ash, 23 wt % polyurethane and 4 wt % glass fiber. When the reinforcement was only applied to one side of the composite, a 49% increase in flexural strength and 106% increase in handleability was observed.

In summary, the application of the fiber reinforcement on the polyurethane composite surface greatly improves the mechanical performance of the composite materials regardless of the existence of fibers in the material body. In addition, with the application of the fiber reinforcement, it is possible to reduce the amount of fibers in the body and the total amount of fibers used in the composite so as to reduce the raw material cost and improve the processability of the highly-filled polyurethane composite materials.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A composite panel comprising:
   a first fiber reinforcement comprising a glass fiber having a basis weight of from 0.5 g/ft$^2$ to 10 g/ft$^2$;
   a polyurethane composite having a first surface and a second surface opposite the first surface, wherein the first surface is in contact with the first fiber reinforcement, and wherein the polyurethane composite comprises (a) a polyurethane formed by the reaction of (i) one or more isocyanates selected from the group consisting of diisocyanates, polyisocyanates, and mixtures thereof, and (ii) one or more polyols; and (b) from 40% to 90% by weight, based on the total weight of the polyurethane composite, of a particulate filler, wherein the polyurethane composite has a thickness of 0.125 inches to 3 inches; and
   a cementitious material comprising 50% or more of a rapid set cement or Portland cement, wherein the cementitious material is adjacent the first fiber reinforcement opposite the polyurethane composite, and wherein the cementitious material has a thickness of 0.005 inch to 0.25 inch;
   wherein the cementitious material provides a wettable surface to the composite panel, and the polyurethane composite is a barrier to water absorbed by the cementitious material that prevents water from passing through the polyurethane composite.

2. The composite panel of claim 1, wherein the composite further comprises a material in contact with the second surface of the polyurethane composite.

3. The composite panel of claim 2, wherein the material comprises a cementitious layer, a paper sheet, a metal sheet, a polymeric layer, or a combination thereof.

4. The composite panel of claim 2, wherein the material includes a second fiber reinforcement.

5. The composite panel of claim 4, wherein the composite panel further comprises a cementitious layer adjacent the second fiber reinforcement.

6. The composite panel of claim 1, wherein the filler in the polyurethane composite comprises fly ash.

7. The composite panel of claim 1, wherein the polyurethane composite has a density of from 2 lb/ft$^3$ to 60 lb/ft$^3$.

8. The composite panel of claim 7, wherein the polyurethane composite has a density of from 10 lb/ft$^3$ to 35 lb/ft$^3$.

9. The composite panel of claim 7, wherein the polyurethane composite has a density of from 35 lb/ft$^3$ to 60 lb/ft$^3$.

10. The composite panel of claim 1, wherein the cementitious material further comprises 30% or less by weight of fly ash, slag, sand, or combination thereof, based on the total weight of the cementitious material.

11. The composite panel of claim 1, wherein the cementitious material comprises a rapid set cement.

12. The composite panel of claim 11, wherein the rapid set cement is selected from calcium aluminate cement (CAC), calcium phosphate cement, calcium sulfate hydrate, calcium sulfoaluminate (CSA) cement, magnesium oxychloride cement, magnesium oxysulfate cement, magnesium phosphate cement, and combinations thereof.

13. The composite panel of claim 1, wherein the cementitious material has an average thickness of from 0.1 inch to 0.25 inch.

14. A building material comprising the composite panel of claim 1.

15. The building material of claim 14, wherein the building material is a tile backer, sheathing, roofing product, or cladding.

16. A composite panel comprising:
a polyurethane composite having a first surface and a second surface opposite the first surface, wherein the polyurethane composite comprises
(a) a polyurethane formed by the reaction of (i) one or more isocyanates selected from the group consisting of diisocyanates, polyisocyanates, and mixtures thereof, and (ii) one or more polyols; and
(b) from 40% to 90% by weight, based on the total weight of the polyurethane composite, of a particulate filler;
a glass fiber reinforcement layer in contact with the first surface of the polyurethane composite, the glass fiber reinforcement layer having a thickness of 0.001 inch to 0.1 inch; and
a cementitious layer adjacent to the glass fiber reinforcement layer opposite the polyurethane composite, wherein the cementitious layer has a thickness of 0.005 inch to 0.25 inch;
wherein the cementitious layer provides a wettable surface to the composite panel, and the polyurethane composite is a barrier to water absorbed by the cementitious layer that prevents water from passing through the polyurethane composite.

17. The composite panel of claim 16, further comprising a water barrier layer between the cementitious layer and the glass fiber reinforcement layer, wherein the water barrier layer comprises an adhesive.

18. The composite panel of claim 16, wherein the polyurethane composite has a density of from 2 lb/ft$^3$ to 60 lb/ft$^3$, and the composite panel has a flexural strength of from 200 psi to 1600 psi.

19. A composite panel comprising:
a polyurethane composite having a first surface and a second surface opposite the first surface, wherein the polyurethane composite comprises
(a) a polyurethane formed by the reaction of (i) one or more isocyanates selected from the group consisting of diisocyanates, polyisocyanates, and mixtures thereof, and (ii) one or more polyols; and
(b) from 40% to 90% by weight, based on the total weight of the polyurethane composite, of a particulate filler;
a glass fiber reinforcement layer in contact with the first surface of the polyurethane composite;
a water barrier layer in contact with the glass fiber reinforcement layer, wherein the water barrier layer comprises an adhesive; and
a cementitious layer in contact with the water barrier layer, the water barrier layer being between the glass fiber reinforcement layer and the cementitious layer;
wherein the cementitious layer provides a wettable surface to the composite panel, and the polyurethane composite and the water barrier layer prevent water absorbed by the cementitious layer from passing through the polyurethane composite.

20. The composite panel of claim 19, wherein the cementitious layer comprises 50% or more of a rapid set cement or Portland cement.

* * * * *